O. H. BURSELL.
AXLE AND THE LIKE BEARING.
APPLICATION FILED FEB. 26, 1914.

1,205,706.

Patented Nov. 21, 1916.
11 SHEETS—SHEET 1.

O. H. BURSELL.
AXLE AND THE LIKE BEARING.
APPLICATION FILED FEB. 26, 1914.

1,205,706.

Patented Nov. 21, 1916.
11 SHEETS—SHEET 2.

O. H. BURSELL.
AXLE AND THE LIKE BEARING.
APPLICATION FILED FEB. 26, 1914.

1,205,706.

Patented Nov. 21, 1916.
11 SHEETS—SHEET 4.

O. H. BURSELL.
AXLE AND THE LIKE BEARING.
APPLICATION FILED FEB. 26, 1914.

1,205,706.

Patented Nov. 21, 1916.
11 SHEETS—SHEET 5.

O. H. BURSELL.
AXLE AND THE LIKE BEARING.
APPLICATION FILED FEB. 26, 1914.

1,205,706.

Patented Nov. 21, 1916.
11 SHEETS—SHEET 6.

O. H. BURSELL.
AXLE AND THE LIKE BEARING.
APPLICATION FILED FEB. 26, 1914.

1,205,706.

Patented Nov. 21, 1916.
11 SHEETS—SHEET 8.

UNITED STATES PATENT OFFICE.

OLOF HENNING BURSELL, OF UMEÅ, SWEDEN.

AXLE AND THE LIKE BEARING.

1,205,706.
Specification of Letters Patent.
Patented Nov. 21, 1916.

Application filed February 26, 1914. Serial No. 821,169.

*To all whom it may concern:*

Be it known that I, OLOF HENNING BURSELL, director, and a subject of the King of Sweden, and resident of Umeå, in the Kingdom of Sweden, have invented a new and useful Improvement in Axle and the like Bearings, of which the following is a specification.

This invention has for its object to provide an axle or the like bearing for a wheel, belt or other pulley for example, so constructed as to allow free relative movement of the axle and wheel or pulley, in a direction in the plane of the wheel or pulley, the axle always being parallel to its normal position, and the arrangement being such that parts are nevertheless efficiently supported or guided as is necessary. For this purpose, according to the invention there are interposed between the axle and the wheel felly at least two eccentrics located one within the other and one of which is mounted on the axle. The eccentrics are associated with springs which tend to maintain the eccentricity, in the case of two eccentrics carried within each other, approximately horizontal for example, so that the axle can only execute a vertical movement.

Various examples of axle bearings embodying the invention are illustrated in the accompanying drawings.

Bearing arrangements according to this invention can be constructed in several different ways, for example, one arrangement may comprise a number of what may be called eccentric bearing rings 2, 3 and 4 or the like supporting each other by means of ball bearings 1, the innermost eccentric bearing ring running with sufficient freedom on the axle.

The eccentric rings can either be free to revolve around each other, or may be connected by any suitable means. When the rings are connected by springs or other yielding means the connection is such as to allow within certain limits the desired self-adjusting mutual movement of the rings.

The purpose of the eccentric bearing rings is, as hereinbefore stated, to give the axle the power of a flexible movement in a direction perpendicular to the axis of the axle, while it always remains parallel to its normal position, and at the same time to effectively guide or support the parts during the movements. At the same time, in order to properly counterbalance the movement of the axle, or in other words, to regulate the centralization without preventing the shifting necessary for smooth and easy running, flexible elastic or spring devices connecting the rim to the axle 5 are provided, the said devices consisting for example of springs 6.

Figures 1, 2, 3, 4, 5, 6:
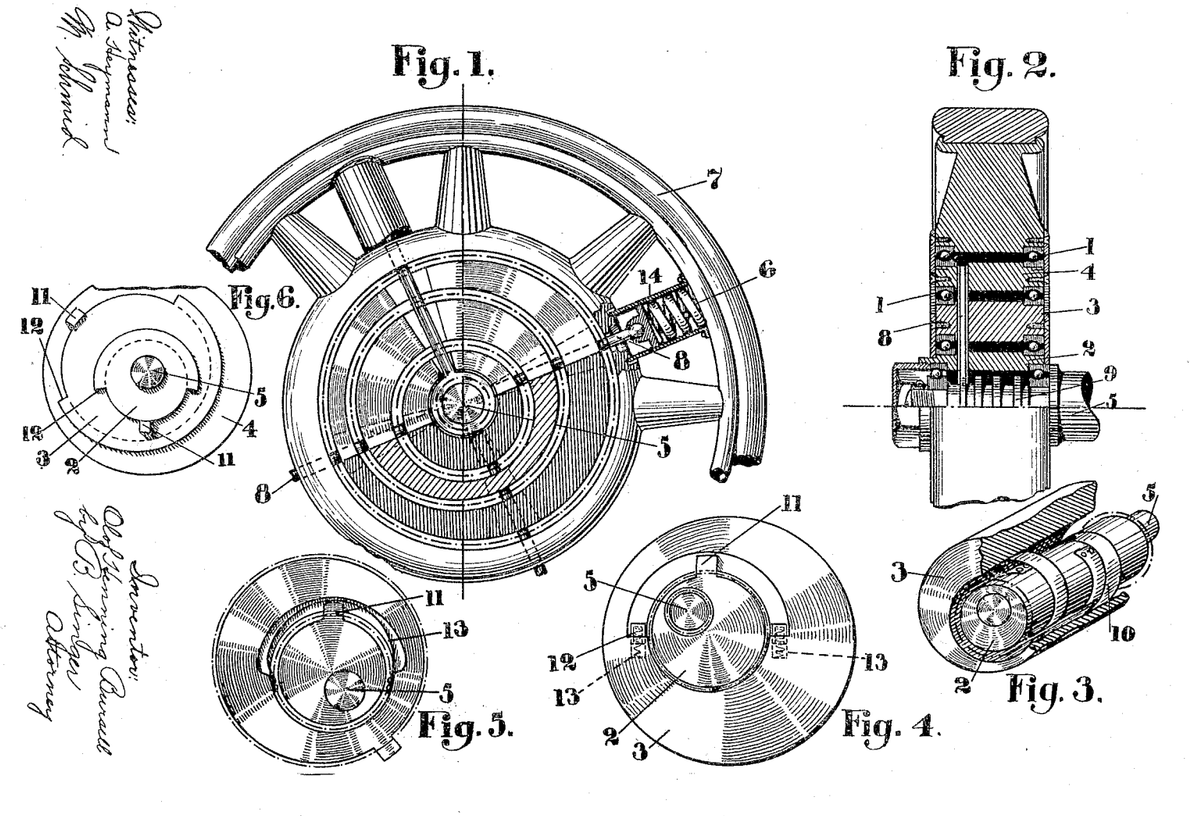
Figure 1 of such drawings illustrates in sectional side elevation a portion of a carriage wheel embodying the invention.
Fig. 2 is a horizontal section through a part of the wheel shown in Fig. 1.
Fig. 3 is a perspective sectional view of the innermost eccentric bearing ring with the next innermost eccentric bearing ring fitted thereon and showing means for coupling together the different eccentric bearing rings.
Figs. 4, 5 and 6 are detail views to which reference will be hereinafter made.

Springs 6 projecting radially from the rim 7, as shown in Figs. 1 and 2, can be connected with the axle either outside the eccentric bearing rings, or by members passing loosely through holes formed in the eccentric bearing rings. In the latter case the connecting members can conveniently be constituted by rods 8, the outer ends of which are associated with the springs 6 and the inner ends of which are directly associated with the axle, as by means of free running rings 9 (Fig. 2) on the latter located at regular intervals along the length of the axle, so that the rods 8 are located at different distances from the ends of the hub around the circumference of the wheel.

The wheel arrangements shown in Figs. 1 to 6, partly through the eccentric bearing rings supporting the axle, and partly through the flexible or spring attachments connecting the axle to the wheel rim, are such that, should the eccentric bearing rings or the flexible or spring attachments become useless, the wheel can still work because the axle will be still held in position although not in concentric relation to the wheel rim. For instance, should the springs break, the axle can at the most only be brought from the center a distance corresponding to the total eccentricity of the several eccentric bearing rings. In addition to the drive being transmitted through the rods 8 striking the ends of the slots in which the rods work and which restrict their movement, the restricted reciprocal movement of the eccentric bearing rings can be produced, as shown in Fig. 3, by spiral springs 10 arranged to connect each two adjacent eccentric bearing rings with each other; or, as shown in Figs. 4, 5 and 6, one or each eccentric bearing ring can be provided with a nose 11 adapted to strike against a stop or shoulder 12 on an adjoining disk. Springs 13, see Figs. 4 and 5, may be associated with the stops 12 to modify or cushion the blows. The arrangements for the restriction of the relative movements of the eccentric bearing rings are intended to prevent all the eccentric bearing rings simultaneously assuming such a position that the axle comes, so to speak, to a dead lock, which does not happen if the eccentric bearing rings or eccentric centers are right above each other. As shown in Fig. 1, it is convenient to place the springs 6 in tube-like guides 14 that extend radially from the inside of the wheel as by this arrangement the springs are efficiently protected.

Figure 7:
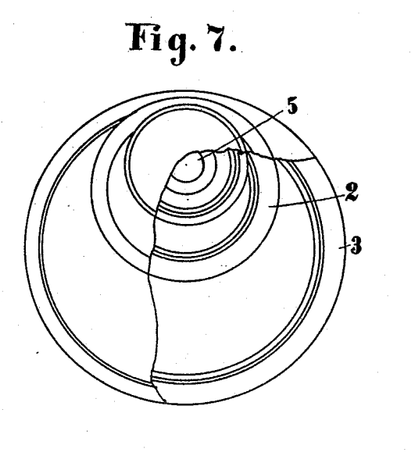
Figs. 7 and 8 show a modified arrangement comprising three eccentric bearing rings in sectional end elevation and in central horizontal section respectively.
Figure 8:
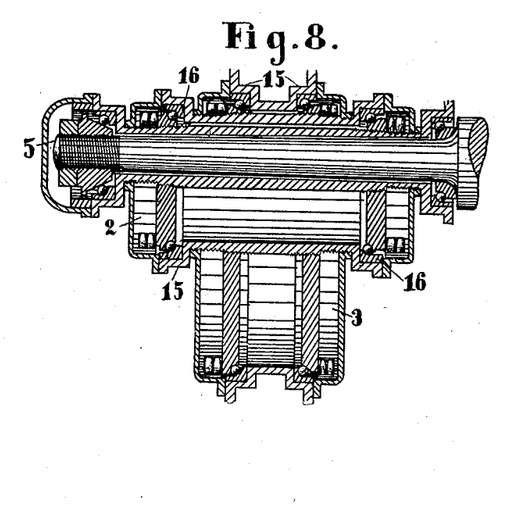

With an arrangement such as shown in Figs. 7 and 8, where the eccentric bearing rings are replaced by eccentric cylinders 2 and 3 it is possible, by means of ball bearings located beside each other, to obtain with eccentric cylinders of comparatively small diameter the same eccentric effect as with eccentric bearing rings of quite large diameter where the ball bearings are arranged one over another. When such eccentric cylinders are used the outer or larger cylinders must be shorter than the inner or smaller ones. The ends of the cylinders are provided or formed with flanges or collars 15 which give support to the concave ball bearing rings 16.

Figure 9:
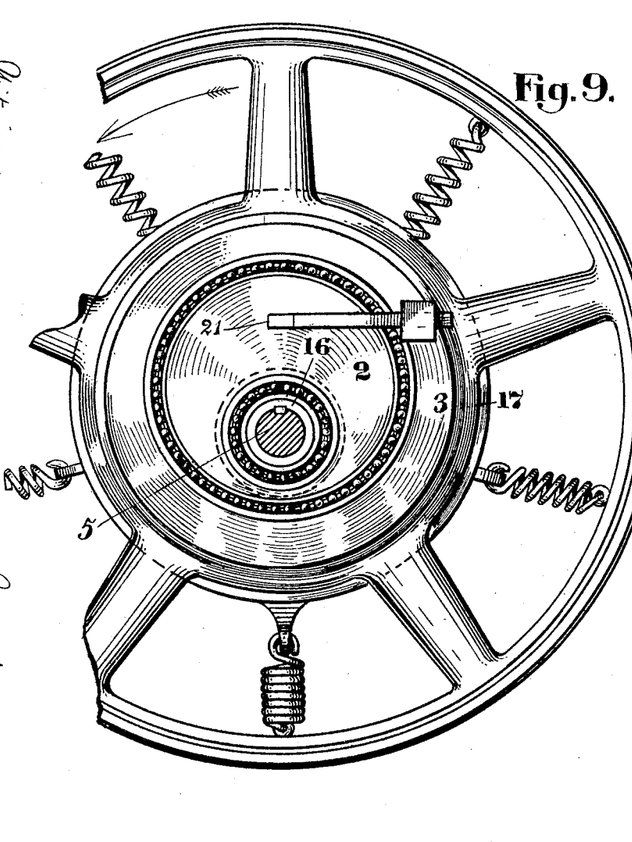
Figs. 9 and 10 illustrate a belt pulley embodying the invention, in sectional side elevation and in central horizontal section respectively.
Figure 10:
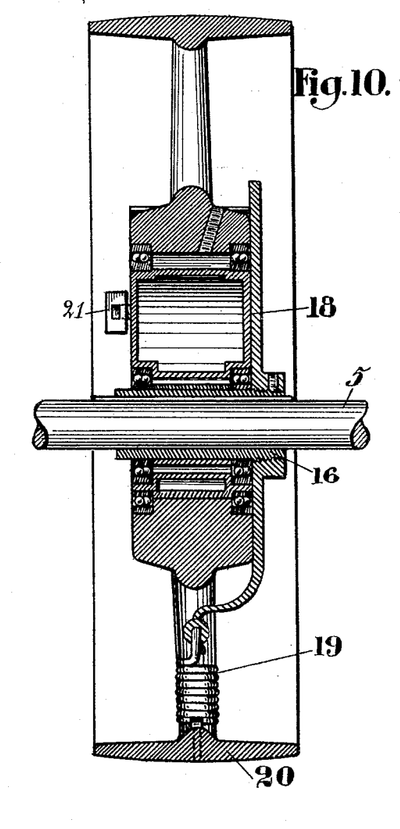

In the arrangement or construction of belt pulley shown in Figs. 9 and 10, the eccentric bearing ring 2 runs free on a sleeve 16 fixed on the axle, ball bearings being interposed. Mounted on the eccentric bearing ring 2 is the hub 17 of the belt pulley, ball bearings being interposed. Fixed as by screwing or the like, on one end of the sleeve 16 is a disk 18 which is connected with the belt pulley rim 20 by means of an arrangement of springs 19. For tensioning the belt a spring weighted arm 21 is provided. Several series of eccentric bearing rings or cylinders can be arranged over one another on the axle to still further increase the eccentricity. Thus eccentric bearing rings can be arranged on a sleeve fixed on the axle, the said sleeve being provided with a flange that can be connected with the wheel rim by means of springs. In one arrangement of axle bearing, according to the invention, one or several eccentric bearing rings is or are connected to the axle by springs. Each spring can be associated at one end with and run along the circumference of the ring and be suitably stressed. In another arrangement two eccentric bearing rings are connected with each other by means of a spring suitably associated with the periphery of the outer bearing ring.

Figures 11, 12:
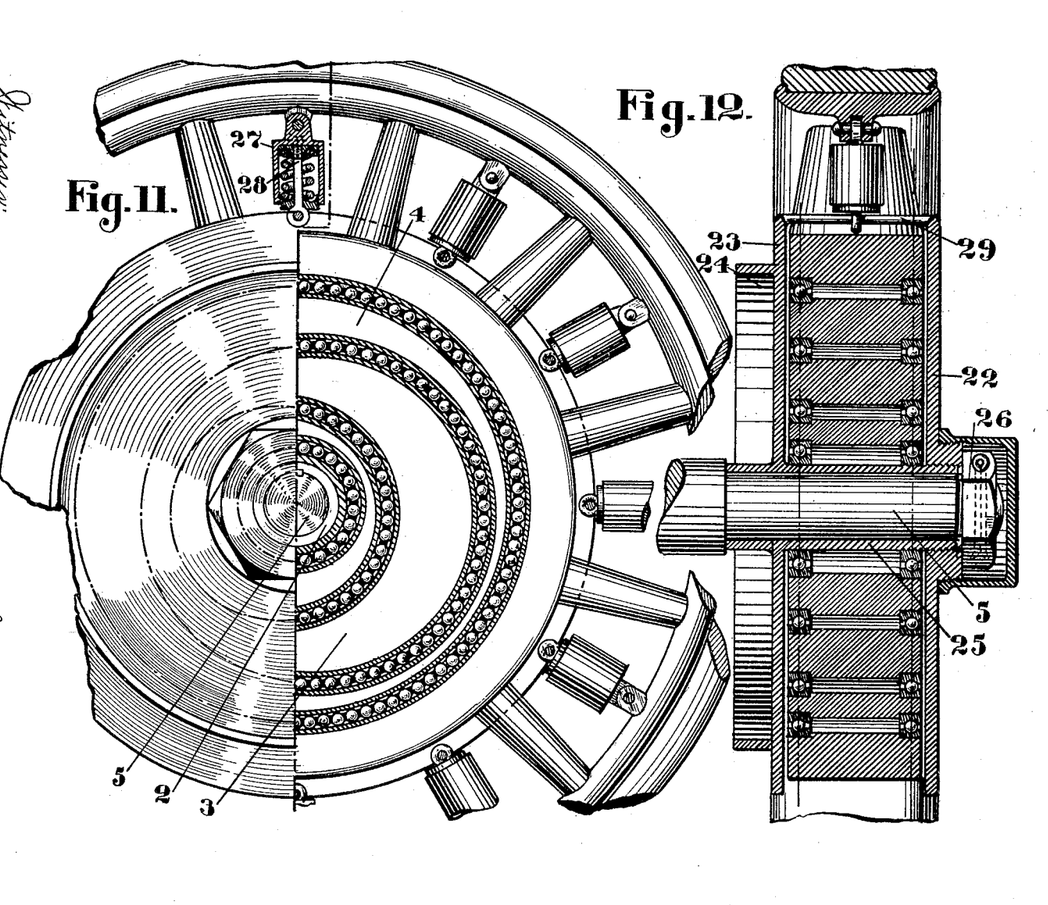
Figs. 11 and 12 illustrate a motor car wheel comprising three eccentric bearing rings, respectively in side elevation partly in section, and in central horizontal section.

Figs. 11 and 12 show the invention applied to a motor car wheel, where, as in previously described arrangements, springs connect the wheel rim with the axle 5. These springs are pivotally connected with disks 22 and 23 fitted on the axle, the disk 23 being connected with a brake wheel 24. The disk 23 is in one piece with the axle socket or sleeve 25 and the disk 22 is fitted on such socket or sleeve. A key, and a nut 26, fixes the socket or sleeve 25 to the axle. The before mentioned spring arrangement consists for each spring of a cylinder 27 pivotally connected with the wheel rim and to which is connected one end of a rod 28 whose other end is connected with the axle by means of disks, such as 22 and 23, through a cross piece 29.

Figures 13, 14:
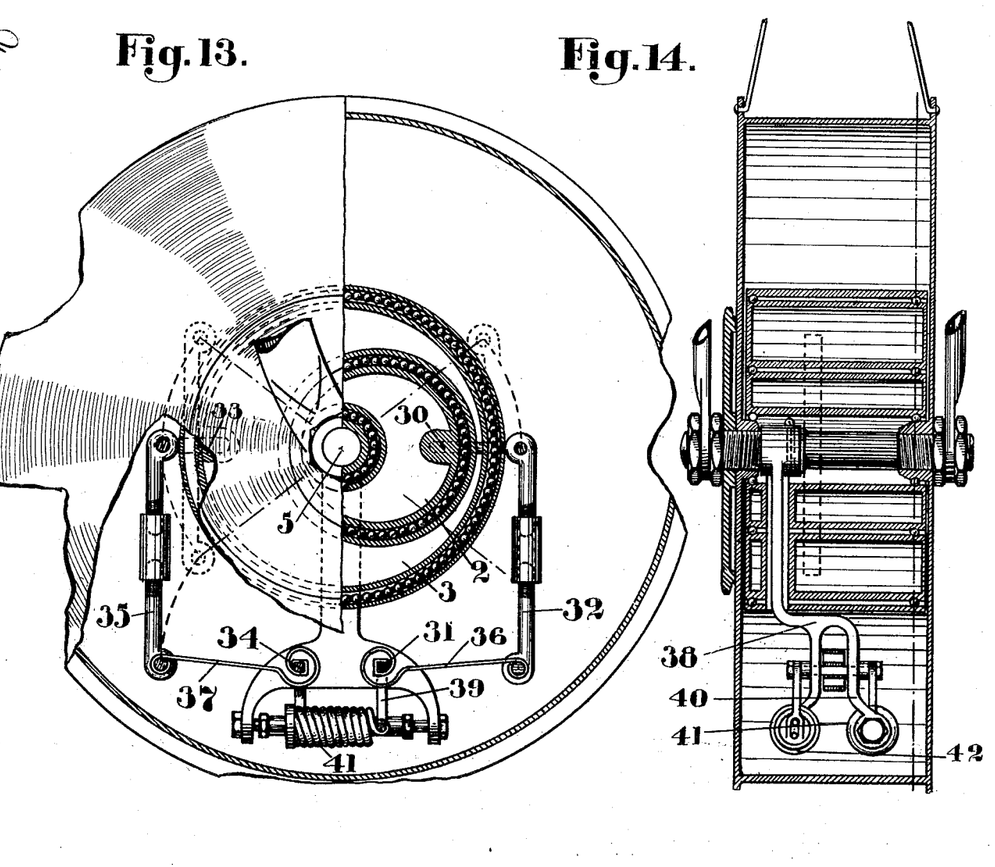
Figs. 13 and 14 illustrate in sectional side elevation and central horizontal section respectively a wheel arrangement comprising two eccentric bearing rings each connected to a corresponding lever arm and the two arms being connected by a system of springs, suspended from the axle and arranged within the hub of the wheel.

Figs. 13 and 14 show the invention applied to a cycle wheel. In this arrangement two eccentric bearing rings 2 and 3 are each connected by means of a projection 30 or 33 integral or fixed to it to a spindle 31 or 34 by means of a link 32 or 35 that is adjustable lengthwise. The spindles 31 and 34 are mounted in side members of a lever arm 38 keyed to the axle 5 and projecting through slots in the eccentric bearing rings 2 and 3. The portions of the spindles 31 and 34 between the side members of the arm 38 are squared and are encircled by a leaf spring 36 and 37, respectively, whose other extremity is wound on a lateral projection of links 32 or 35. In order to prevent an excessive strain on the springs 36 and 37 in case of a severe jolting the spindles 31 and 34 are mounted rotatably in the side members of the arm 38 and each spindle is fitted with an arm 39 or 40 which is associated with a helical spring 41 and 42. These springs are connected with the lever 38, as shown. The whole system of springs and connections is only for the purpose of holding the eccentrics in a normal position and so centering the axle, and may be mounted together with the eccentric bearing rings in the hub of a cycle wheel.

The operation of the device is as follows: Assuming that a bicycle provided with the improved bearing arrangement is on an uneven road and that an obstacle meets the wheel from below so that this latter moves upward in the direction of the thrust. The axle tends to move in an opposite direction, i. e. downward toward the point of the thrust. When the axle moves downward the smaller eccentric 2 will be forced to rotate toward the left, that is, counter-clockwise and the link 32 will be brought to a position indicated in dotted lines in Fig. 13. The other eccentric 3 turns under the influence of the thrust toward the right, that is clockwise, and the link 35 is forced into the dotted line position shown in Fig. 13. The rotation of the two eccentric bearing rings in opposite directions causes the axle to move in a vertical position and to remain always parallel to its normal position. Because the links 32 and 33 are also connected to the springs, the latter will be more and more stressed during the entire rotary movement of the eccentric bearing rings and consequently of the links, whereby they tend to bring the eccentrics and the axle back into the starting position. It is obvious that the springs do not, therefore, have a supporting function, but only the purpose of effecting the return of the axle to its normal position after it has been displaced under the influence of a sudden jolt or thrust. The upward and downward vertical movements of the axle against the tendency of the springs to bring the former back into normal position produce a yielding or elastic vertical oscillating movement of the axle, so that a solid wheel tire may be employed instead of a pneumatic one.

Figures 15, 16, 17, 18, 19, 20, 21, 22:
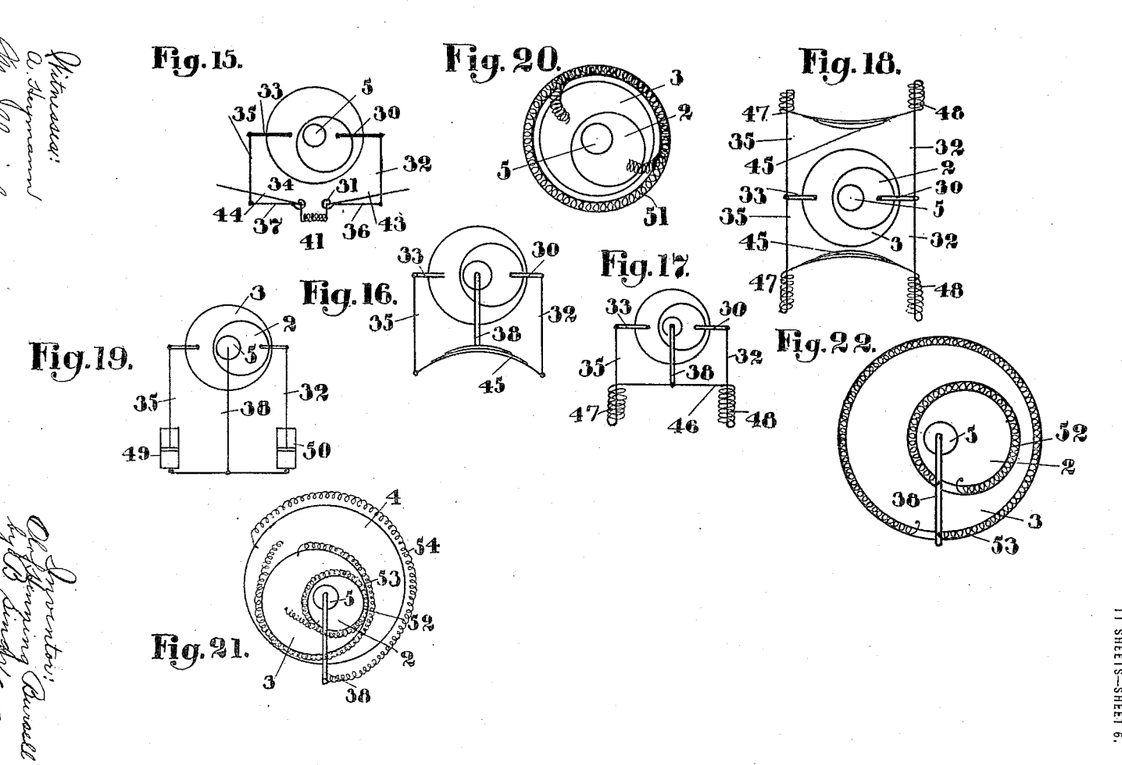
Fig. 15 is a modification of Fig. 14, wherein the springs for centering the axle are provided with weighted levers to compensate excessive strains.
Fig. 16 is another modification of Fig. 14 illustrating a simplified method of centering the axle.
Fig. 17 is a modification of the arrangement shown in Fig. 16, indicating a different method of interconnecting the eccentrics with the axle.
Fig. 18 is a modification combining the arrangement shown in Figs. 16 and 17.
Fig. 19 diagrammatically indicates the employment of dash pots for centering the axle.
Fig. 20 illustrates two eccentric bearing rings interconnected by a helical spring.
Fig. 21 is a modification of the arrangement shown in Fig. 20, illustrating three eccentric bearing rings interconnected by helical springs.
Fig. 22 illustrates a modification of the arrangement shown in Fig. 21.

Fig. 15 is a diagram illustrating an application of an arrangement similar to that last described. The springs 41 and 42 are replaced by weighted arms 43 and 44 connected with the corresponding spindle spring 31 or 34. In some cases, and if desired, both the springs 41 and 42 and the weighted arms 43 and 44 can be used simultaneously.

According to the arrangement diagrammatically indicated in Fig. 16 the spring arrangement 31, 34, 36, 37, 41, 42, 43, 44 is replaced by a flat or leaf spring 45, the ends of which are connected to links 32 and 35 and the middle portion of which is supported by an arm 38.

The arrangement diagrammatically indicated in Fig. 17 differs from that of Fig. 16 only in that the leaf spring 45 is replaced by a cross stay 46 fixed to the arm 38 at its middle portion and connected at its ends to springs 47 and 48, which are connected to links 32 and 35.

Fig. 18 indicates a part combination of the arrangements shown in Figs. 16 and 17. It will be seen that there are two springs 45, and two springs 47 and 48.

In the arrangement diagrammatically indicated in Fig. 19 the springs 47 and 48 of Fig. 17 are replaced by two or several pump or dash pot cylinders 49 and 50.

Fig. 20 shows two eccentric bearing rings 2 and 3 coupled together by a helical spring 51 wound around the periphery of the outer bearing ring 3 and connected at one end to one said ring and at the other end to the other ring.

Fig. 21 illustrates three eccentric bearing rings 2, 3 and 4 with helical springs 52, 53 and 54 wound around them. The spring 52 is wound around the innermost bearing ring 2 and has one end fixed to the said eccentric bearing ring and its other end fixed to the eccentric bearing ring 3; the spring 53 is wound around the ring 3 and has one end fixed to such ring, its other end being fixed to the ring 4 while the spring 54 is wound around the bearing ring 4 and has its one end fixed to said ring and its other end fixed to the axle 5 by means of an arm 38.

Fig. 22 indicates an arrangement similar to that shown in Fig. 21 but the springs 52 and 53 of the bearing rings 2 and 3 respectively, instead of being attached to the adjacent eccentric bearing rings, are directly attached to the lever arm 38.

Figure 23:
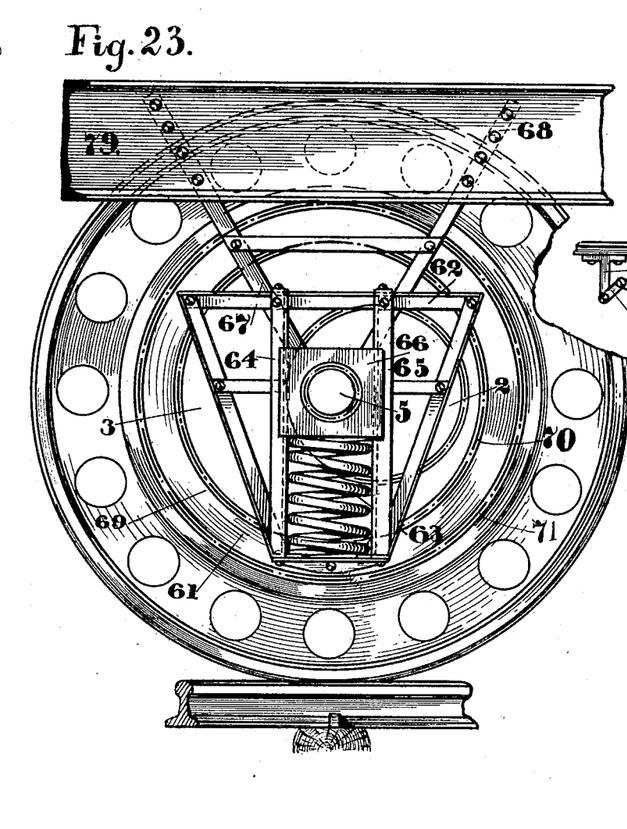
Fig. 23 illustrates an arrangement wherein the weight of the carriage is transferred to a ring around which the wheel ring revolves.

In the arrangement shown in Fig. 23, the eccentric bearing rings 2 and 3 are supported as by means of ball bearings in a ring 61 around which the wheel rim 70 is in its turn mounted to revolve, most suitably on interposed ball bearings. The ring 61 supports the axle 5 by means of a supporting bracket 62. The axle 5 is effectively guided in the bracket 62 by means of a guideway suitably consisting of two side members 64 and 66 and is resiliently supported by means of a spring 63. The axle 5 is also connected to the carriage by means of springs, not shown, or by bracket supports 67, 68, which are suitably fastened at their lower ends to a bearing block or axle support 65. The weight of the carriage on the wheel is thus transferred through the bracket supports 67, 68, the axle support 65, the spring 63, the bracket 62, and the ring 61, by which means the transfer of force from the axle to the wheel, and vice versa takes place without the eccentric bearing rings, which are located inside the ring 61, sustaining any severe shock. The said eccentric bearing rings 2 and 3 are thus exempted from acting as supports, but on the other hand they serve to efficiently guide the axle. This arrangement even permits of the eccentric bearing rings themselves not being guided as they are sufficiently guided by the ring 61 on the one hand and the axle 5 on the other.

Figures 24, 28, 29:
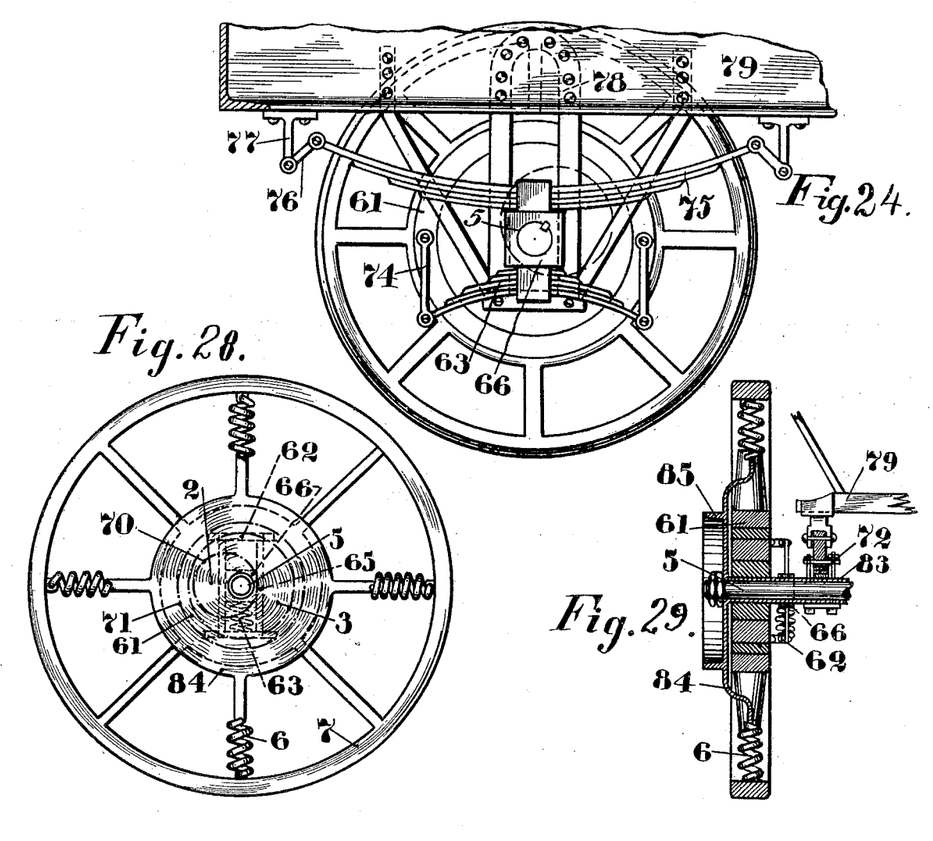
Fig. 24 is a modification of the arrangement shown in Fig. 23.
Fig. 28 is a side elevation showing another application of the improved bearing to a driving wheel.
Fig. 29 is a central horizontal section of the driving wheel shown in Fig. 28.

In the arrangement shown in Fig. 24, distinguished from that just described, the supporting bracket is constituted by a spring 63 attached to the ring 61 and to the axle 5 or axle bearing 66. The connection with the ring 61 can be by means of links 74. The connection with the body 79 of the carriage can be not only as described with reference to Fig. 23, but may be through a spring 75, for example, or through several such springs which may be of leaf, helical or other type. In the example under notice the attachment of the spring 75 to the body of the carriage is by means of links 76 and supporting brackets 77. In order to give support to the axle and to the wheel in a horizontal direction a supporting piece 78 can be attached to the body of the carriage.

Figure 25:
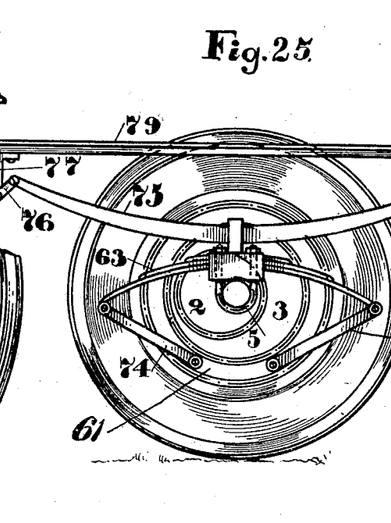
Fig. 25 is another modification of the arrangement shown in Fig. 23.

Fig. 25 shows in the main a similar arrangement to that of Fig. 24, the main difference being that both the springs 63 and 75 are placed above the axle 5 and that the support for the axle in a horizontal direction is omitted.

Figures 26, 27, 35, 36:
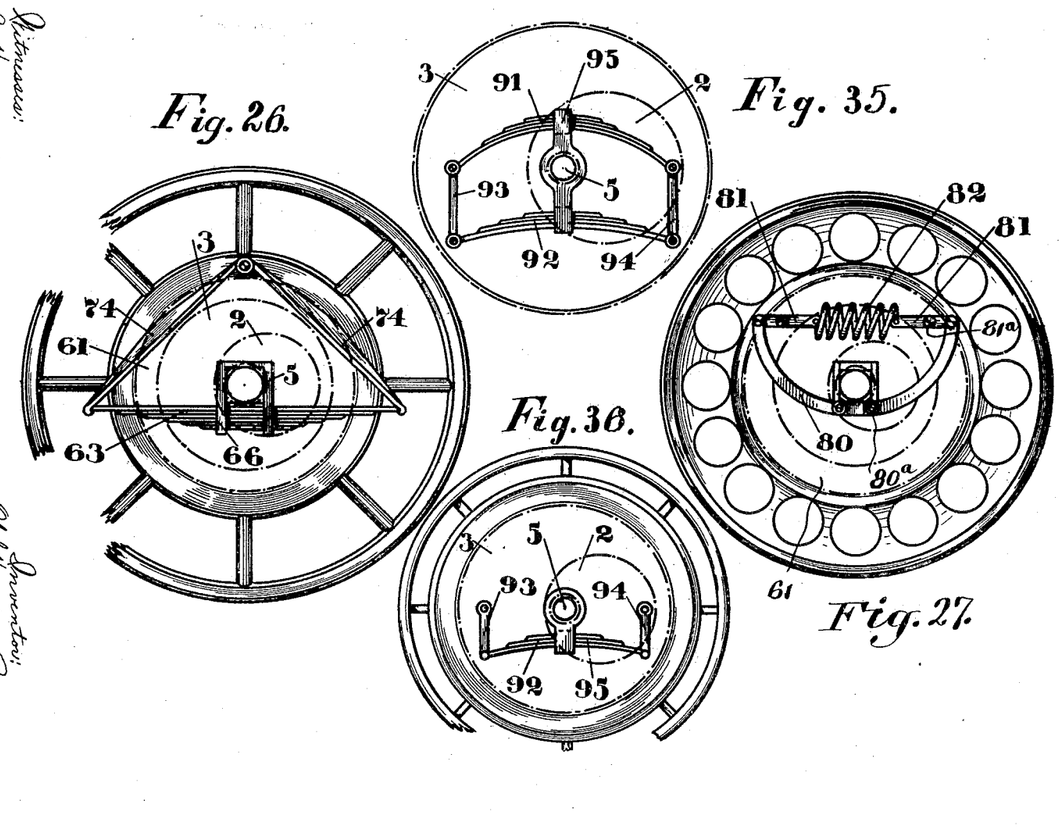
Fig. 26 illustrates an arrangement of supporting the axle on a leaf spring connected with the wheel hub.
Fig. 27 is a modification of the arrangement shown in Fig. 26.
Fig. 35 shows a still further modification of the means for maintaining the eccentrics in normal position.
Fig. 36 indicates a modification of the arrangement shown in Fig. 35

In the arrangement shown in Fig. 26 the axle 5 rests on a leaf or blade spring 63 which is connected with the wheel hub by links or stays 74. The axle support 66 is of the shape shown.

According to the arrangement shown in Fig. 27 the spring 63 is replaced by bent brackets 80 or the like, which by means of a spring arm 81, or arms, is attached to the ring 61. The spring of the arm 81 can, as shown for instance be provided for by helically twisting the middle portion 82 of the arm. The arms 81 are pivoted at 81$^a$ to the ring 61 and the bent brackets 80 are pivoted at 80$^a$ to the axle bearing, as shown.

According to the arrangement shown in Figs. 28 and 29, which represent a wheel adapted to be driven by motor power, for instance a motor car wheel, the axle bearing 66 is fixed to an axle socket or sleeve 83 which encircles the axle 5. The supporting spring 72 is arranged on the socket or sleeve 83. A spring 63, which is associated with the bearing 65, is carried in a bracket 62 fixed to the ring 61. The innermost eccentric bearing ring 2 is mounted to rotate in bearings around the axle socket or sleeve 83. At the outer end of the axle 5 is a disk or the like 84, provided with one or several spring arm brackets 6 which are connected to the wheel rim 7. By the transference of power from the axle 5, through the disk 84 and springs 6, the wheel 7 is rotated. 85 is a brake drum which may be fixed on the said stay, disk, or ring 84.

Figure 30:
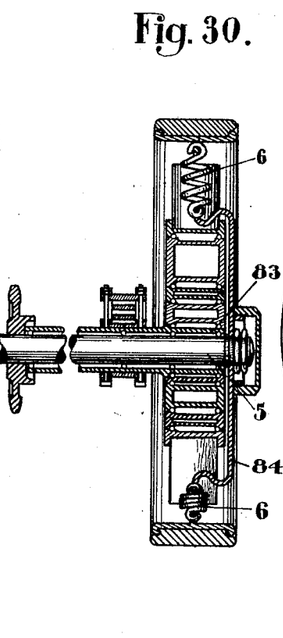
Fig. 30 shows in central cross section a motor car wheel embodying the invention.

Fig. 30 illustrates an arrangement that resembles the arrangement last described in that the eccentric bearing rings run in bearings on the socket or sleeve 83, but the ring 61 and its attendant combination, such as bracket 62 and axle support 66, etc., are omitted. As in the previous example the driving power is transferred from the axle 5 to the disk 84, and thence to the wheel.

Figure 31:
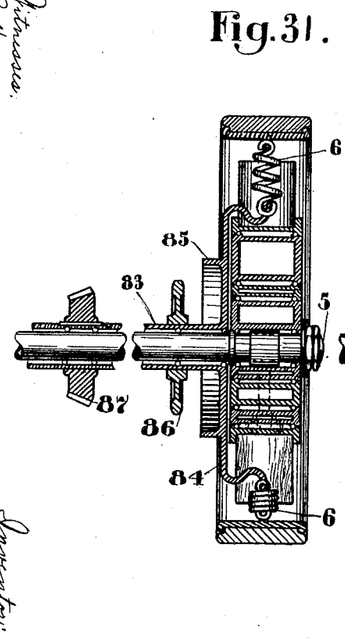
Fig. 31 is a similar view of Fig. 30 illustrating a modified construction of motor car wheel according to the invention.

Fig. 31 shows in central horizontal section an arrangement of the kind under notice with eccentric bearing rings wherein the power is transferred through cog-wheel or chain gearing to the rim. As in some of the arrangements previously described there is fitted on the axle 5 a tube or sleeve 83 to which a disk 84 or the like of the kind previously described is fastened, which is connected to the rim by means of springs. The chain wheel 86 or the bevel wheel 87 is fixed on the tube or sleeve 83. This construction can for instance be used for cycles as the power from the chain wheel 86, or the toothed wheel 87, is transferred to the sleeve 83, and thence through the disk 84 to the rim. On the sleeve 83 or the disk 84 a brake drum can be attached. The chain wheel 86 can be arranged on the periphery of the toothed wheel. In this case the axle 5 is firmly connected to the carriage and the tube or sleeve 83 can freely rotate on the axle 5.

Figure 32:
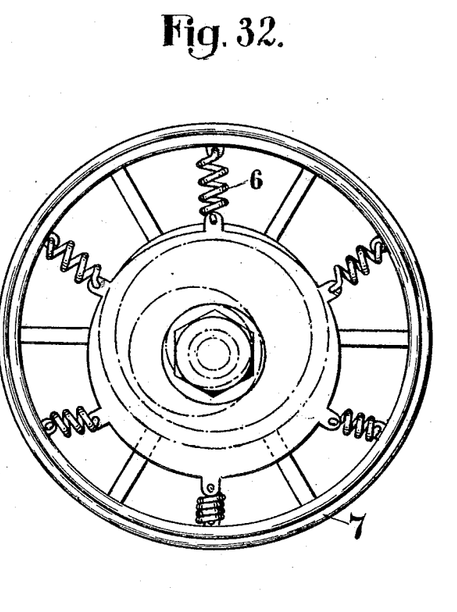
Fig. 32 shows in side elevation another motor car wheel.

Fig. 32 is a side elevation of the arrangement shown in Fig. 31.

Figures 33, 34, 37, 38, 39:
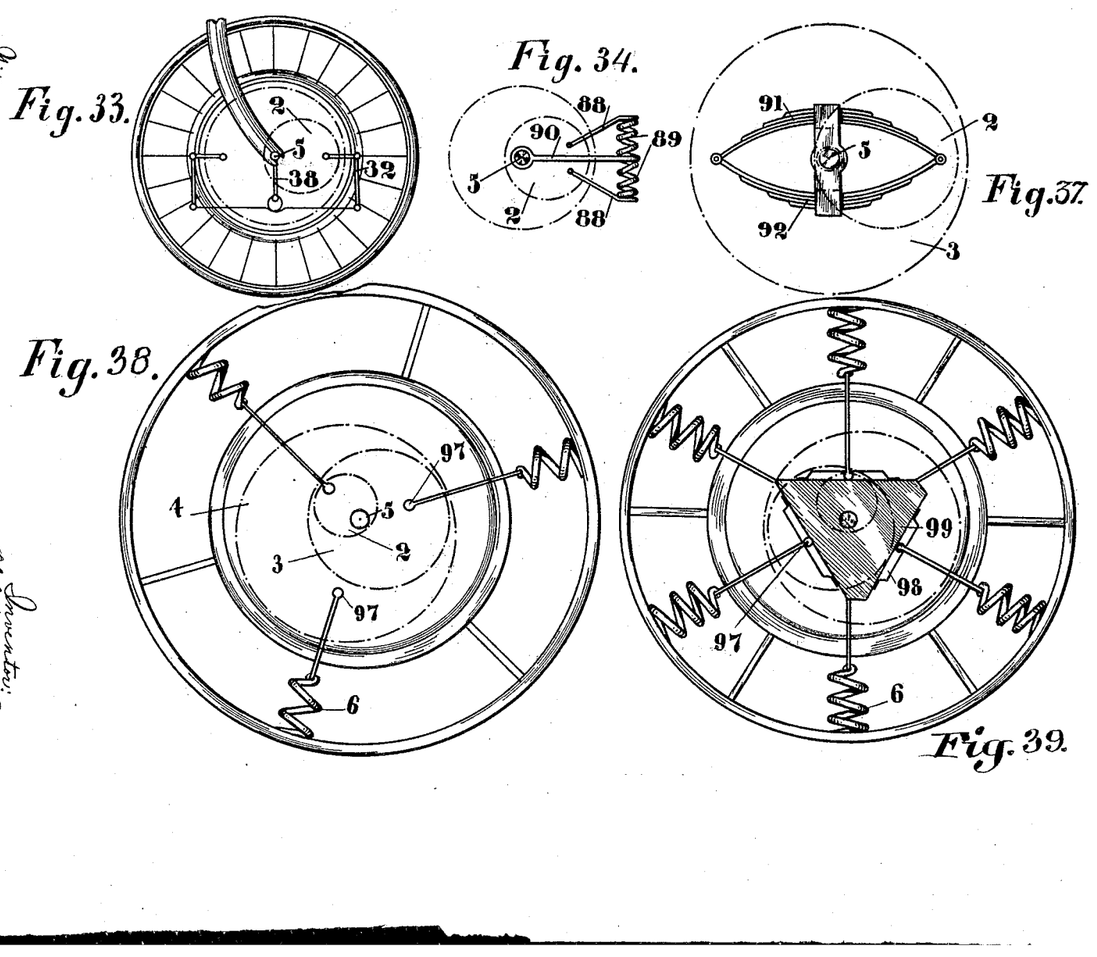
Fig. 33 illustrates an arrangement wherein the bearings are interconnected outside the axle hub.
Fig. 34 shows a further modification for interconnecting the eccentric bearing rings.
Fig. 37 is another modification of the arrangement shown in Fig. 35.
Figs. 38 and 39 illustrate in side elevation two constructions of bearings embodying the invention, the eccentric bearing rings being directly supported from the rim in the one case, while in the other case the connection thereof with the rim is by means of a member of triangular shape.

Fig. 33 illustrates an arrangement wherein the springs which unite the eccentric bearing rings 2 and 3, are attached outside the hub of the axle.

Fig. 34 shows an eccentric bearing ring 2 with the axle, the bearing for the said ring being at the periphery of the ring. Projecting from the eccentric bearing rings are arms 88 connected by an arrangement of springs 89 which are connected with the axle 5 by an arm or bracket 90. One of the arms 88 is connected to the eccentric ring 2 and the other to the eccentric ring 3.

In the arrangement shown in Fig. 35 the eccentric bearing rings 2 and 3 are maintained in the desired relative positions by springs 91 and 92 which are connected by means of links 93 and 94, the ends of the spring 92 being free from the rings. The springs 91 and 92 are connected with the axle 5 by a cross stay 95.

The arrangement shown in Fig. 36 differs from that shown in Fig. 35 in that only the spring 92 is coupled to the axle 5 by the cross stay 95. The ends of the spring are coupled to the eccentric bearing rings 2 and 3 by means of links 93 and 94, as previously described.

The arrangement shown in Fig. 37 differs from that shown in Fig. 35 in that the spring 92 is reversed in position and is attached to the spring 91 without links, by means of pivot pins, one of which is connected to the eccentric ring 2 and the other to the eccentric ring 3.

In all the arrangements described with reference to Figs. 33 to 37 inclusive, the axle 5 is firmly connected to the vehicle and does not rotate.

According to the arrangement shown in Fig. 38, three eccentric bearing rings 2, 3 and 4 are connected by means of pivots 97 or the like with the wheel rim, for example by rods and springs, the arrangement being such that a dead lock cannot occur between the said parts because the axle automatically assumes a central position in its bearings.

The arrangement shown in Fig. 39 differs from that described with reference to Fig. 38 in that the pivots 97 are mounted to slide in guides 98 on a member 99 which is fixed on the axle, and is connected to the wheel rim in one or several places. If, for instance, the member 99 is of triangular shape as shown, the connection with the wheel rim can be from its apex by means of links and springs.

What I claim as my invention and desire to secure by Letters Patent, is:

1. A bearing for an axle of a vehicle wheel, pulley, or the like, comprising a plurality of eccentrics, one of said eccentrics being rotatably mounted on the axle and surrounded by another of said eccentrics and means to interconnect the axle and the eccentrics to maintain the eccentrics in normal position.

2. A bearing for an axle of a vehicle wheel, pulley, or the like, comprising a plurality of eccentrics, one of said eccentrics being mounted on the axle and surrounded by another of said eccentrics and adjustable means to interconnect the axle and the eccentrics to maintain the eccentrics in normal position.

3. A bearing for an axle of a vehicle wheel, pulley, or the like, comprising a plurality of eccentrics, one of said eccentrics being mounted on the axle and surrounded by another of said eccentrics, means to interconnect the axle and the eccentrics and additional means to compensate for an excessive strain of said first named means.

4. A bearing for an axle of a vehicle wheel, pulley, or the like, comprising a plurality of eccentrics, one of said eccentrics being mounted on the axle and surrounded by another of said eccentrics, adjustable means to interconnect the axle and the eccentrics and additional means to compensate for an excessive strain of said first named means.

5. A bearing for an axle of a vehicle wheel, pulley, or the like, comprising a plurality of eccentrics, one of said eccentrics being mounted on the axle and surrounded by another of said eccentrics, and means to interconnect said plurality of eccentrics and the axle, said means being secured to said eccentrics on opposite sides of the axle.

6. A bearing for an axle of a vehicle wheel, pulley, or the like, comprising a plurality of eccentrics, one of said eccentrics being mounted on the axle and surrounded by another of said eccentrics and adjustable means to interconnect said plurality of eccentrics and the axle, said means being secured to said eccentrics on opposite sides of the axle, 7. A bearing for an axle of a vehicle wheel, pulley, or the like, comprising a plurality of eccentrics, one of said eccentrics being mounted on the axle and surrounded by another of said eccentrics and means to interconnect said plurality of eccentrics and the axle and additional means to compensate for an excessive strain of said first named means.

8. A bearing for an axle of a vehicle wheel, pulley, or the like, comprising a plurality of eccentrics, one of said eccentrics being mounted on the axle and surrounded by another of said eccentrics, adjustable means to interconnect said plurality of eccentrics and the axle and additional means to compensate for an excessive strain of said first named means.

9. A bearing for an axle of a vehicle wheel, pulley, or the like, comprising a plurality of eccentrics, one of said eccentrics being mounted on the axle and surrounded by another of said eccentrics, and means to interconnect said plurality of eccentrics and the axle to insure their normal position.

10. A bearing for an axle of a vehicle wheel, pulley, or the like, comprising a plurality of eccentrics, one of said eccentrics being mounted on the axle and surrounded by another of said eccentrics, arms on said eccentrics, links connected to said arms, an arm keyed to said axle and spindles rotatably held by said arm and flexibly connected with said links.

11. A bearing for an axle of a vehicle wheel, pulley, or the like, comprising a plurality of eccentrics, one of said eccentrics being mounted on the axle and surrounded by another of said eccentrics, arms on said eccentrics, adjustable links connected to said arms, an arm keyed to said axle and spindles rotatably held by said arm and flexibly connected with said links.

12. A bearing for an axle of a vehicle wheel, pulley, or the like, comprising a plurality of eccentrics, one of said eccentrics being mounted on the axle and surrounded by another of said eccentrics, arms on said eccentrics, links connected to said arms, an arm keyed to said axle, spindles rotatably held by said arm and springs connecting said spindles and said links, substantially as described.

13. A bearing for an axle of a vehicle wheel, pulley, or the like, comprising a plurality of eccentrics, one of said eccentrics being mounted on the axle and surrounded by another of said eccentrics, arms on said eccentrics, adjustable links connected to said arms, an arm keyed to said axle, spindles connected with said arm and with said links, springs inserted between the said links and said spindles and additional springs inserted between the said spindles and said arm.

14. A bearing for an axle of a vehicle wheel, pulley, or the like, comprising a plurality of eccentrics, one of said eccentrics being mounted on the axle and surrounded by another of said eccentrics, arms on said eccentrics, links connected to said arms, spindles being resiliently connected with said links and an additional arm projecting through said eccentrics and adapted to rotatably support said spindles.

15. A bearing for an axle of a vehicle wheel, pulley, or the like, comprising a plurality of eccentrics, one of said eccentrics being mounted on the axle and surrounded by another of said eccentrics, arms on said eccentrics, links connected with said arms, spindles resiliently connected with said links and an additional arm to connect said spindles with the axle, said spindles being rotatably mounted on said additional arm.

16. A bearing for an axle of a vehicle wheel, pulley, or the like, comprising a plurality of eccentrics, one of said eccentrics being mounted on the axle and surrounded by another of said eccentrics, arms on said eccentrics, adjustable links connected to said arms and an additional arm projecting through said eccentrics and fast to the axle, spindles rotatably mounted on said additional arm, springs inserted between said spindles and said links and additional springs interposed between said spindles and the axle.

17. A bearing for an axle of a vehicle wheel, pulley, or the like, comprising a plurality of eccentrics, one of said eccentrics being mounted on the axle and surrounded by another of said eccentrics, arms on said eccentrics and an additional arm projecting through said eccentrics and fast to the axle, lengthwise adjustable links connected with said arms, spindles rotatably mounted on said additional arm, leaf springs interposed between said spindles and said links and helical springs being inserted between said spindles and the axle, substantially as described.

18. A bearing for an axle of a vehicle wheel, pulley, or the like, comprising a plurality of eccentrics, one of said eccentrics being mounted on the axle and surrounded by another of said eccentrics and means for connecting the axle and said eccentrics, said means being adapted to centralize the axle.

19. A bearing for an axle of a vehicle wheel, pulley, or the like, comprising a plurality of eccentrics, one of said eccentrics being mounted on the axle and surrounded by another of said eccentrics and resilient means for connecting the axle and said eccentrics, said means being adapted to centralize the axle.

20. A bearing for an axle of a vehicle wheel, pulley, or the like, comprising a plurality of eccentrics, one of said eccentrics being mounted on the axle and surrounded by another of said eccentrics and means projecting through said eccentrics and additional means interconnecting the axle with the eccentrics to maintain the latter in normal position.

21. A bearing for an axle of a vehicle wheel, pulley, or the like, comprising an eccentric bearing ring rotatably mounted on the axle, another bearing ring rotatably and eccentrically mounted on said first named bearing ring and being concentrically disposed to the axle, and means for interconnecting said bearing rings with said axle.

22. A bearing for an axle of a vehicle wheel, pulley, or the like, comprising an eccentric bearing ring rotatably mounted on the axle, another bearing ring rotatably and eccentrically mounted on said first named bearing ring and being concentrically disposed to the axle, and means engaging the eccentrics on opposite sides of the axle for connecting the eccentrics with the axle.

23. A bearing for an axle of a vehicle wheel, pulley, or the like, comprising a plurality of eccentrics, one arranged within the other, the inner eccentric being rotatably mounted on the axle and means for connecting the axle with both of said eccentrics.

24. A bearing for an axle of a vehicle wheel, pulley, or the like, comprising a plurality of eccentrics, one arranged within the other, the inner eccentric being mounted on the axle and means for connecting the axle with said eccentrics, said means and eccentrics being adapted to permit a vertical parallel displacement of the axle and to centralize the axle.

25. A bearing for an axle of a vehicle wheel, pulley, or the like, comprising a plurality of eccentrics, one of said eccentrics being rotatably mounted on the axle, another of said eccentrics being rotatably mounted on said first named eccentric and surrounding the same and means for maintaining said eccentrics in and returning the same to normal position when said eccentrics have been displaced under the influence of a jolt.

26. A bearing for an axle of a vehicle wheel, pulley, or the like, comprising a plurality of eccentrics, one of said eccentrics being rotatably mounted on the axle, another of said eccentrics being rotatably mounted on said first named eccentric and surrounding the same, and resilient means for maintaining said eccentric in and returning the same to normal position when said eccentrics have been displaced under the influence of a jolt.

27. A bearing for an axle of a vehicle wheel, pulley, or the like, comprising a plurality of eccentrics, one of said eccentrics being rotatably mounted on the axle, another of said eccentrics being rotatably mounted on said first named eccentric and surrounding the same and springs engaging said eccentrics, said springs being adapted to maintain said eccentrics in and return the same to normal position when said eccentrics have been displaced under the influence of a jolt.

28. A bearing for an axle of a vehicle wheel, pulley, or the like, comprising a plurality of eccentrics, one of said eccentrics being rotatably mounted on the axle, another of said eccentrics being rotatably mounted on said first named eccentric and surrounding the same and means for maintaining normally the eccentrics in a position in which their eccentricities are in a horizontal plane and for returning said eccentrics to said position when the same have been displaced under the influence of a jolt.

Signed at Stockholm Jan. 19th, 1914.

In testimony whereof I affix my signature in presence of two witnesses.

OLOF HENNING BURSELL.

Witnesses:
ERNEST NAIDLINDH,
GRETA PRIEN.

Copies of this patent may be obtained for five cents each, by addressing the "Commissioner of Patents, Washington, D. C."